United States Patent
Ong et al.

(10) Patent No.: US 6,218,757 B1
(45) Date of Patent: Apr. 17, 2001

(54) MINIMIZING SHAFT CURRENTS IN DYNAMOELECTRIC MACHINES

(75) Inventors: Raymond K. J. Ong; James H. Dymond, both of Peterborough; Raymond D. Findlay, Ancaster, all of (CA)

(73) Assignee: General Electric Canada Inc, Mississauga (CA)

( * ) Notice: Subject to any disclaimer, the term of this patent is extended or adjusted under 35 U.S.C. 154(b) by 0 days.

(21) Appl. No.: 09/200,787

(22) Filed: Nov. 30, 1998

(51) Int. Cl.[7] ................................................. H01R 39/52
(52) U.S. Cl. ....................... 310/223; 310/67 R; 310/71; 310/75 D; 310/60 A; 310/61; 310/79
(58) Field of Search .................... 310/223, 67 R, 310/71, 75 D, 60 A, 61, 79

(56) References Cited

U.S. PATENT DOCUMENTS

| | | | |
|---|---|---|---|
| 4,609,251 | * 9/1986 | Nakaoka et al. | 359/200 |
| 5,136,195 | * 8/1992 | Allen, III et al. | 310/68 D |
| 5,625,244 | * 4/1997 | Bradfield | 310/232 |
| 5,661,352 | * 8/1997 | Oguchi et al. | 310/71 |
| 5,705,868 | * 1/1998 | Cox et al. | 310/71 |

* cited by examiner

*Primary Examiner*—Clayton LaBalle
*Assistant Examiner*—Thanh Lam

(57) ABSTRACT

Some dynamoelectric machines develop shaft E.M.F.'s during operation which lead to circulation currents in the shaft of the machine. The shaft current will attempt to flow through the bearings of the machine, unless some action is taken to prevent or limit said current flow. This invention minimizes the circulation of rotor shaft currents by providing a return path for the shaft current through an insulated conductor located in the center of the shaft of the machine. The insulated conductor is electrically attached to the shaft at the ends of the conductor. The conductor may extend the length of the shaft.

10 Claims, 3 Drawing Sheets

FIG.1.
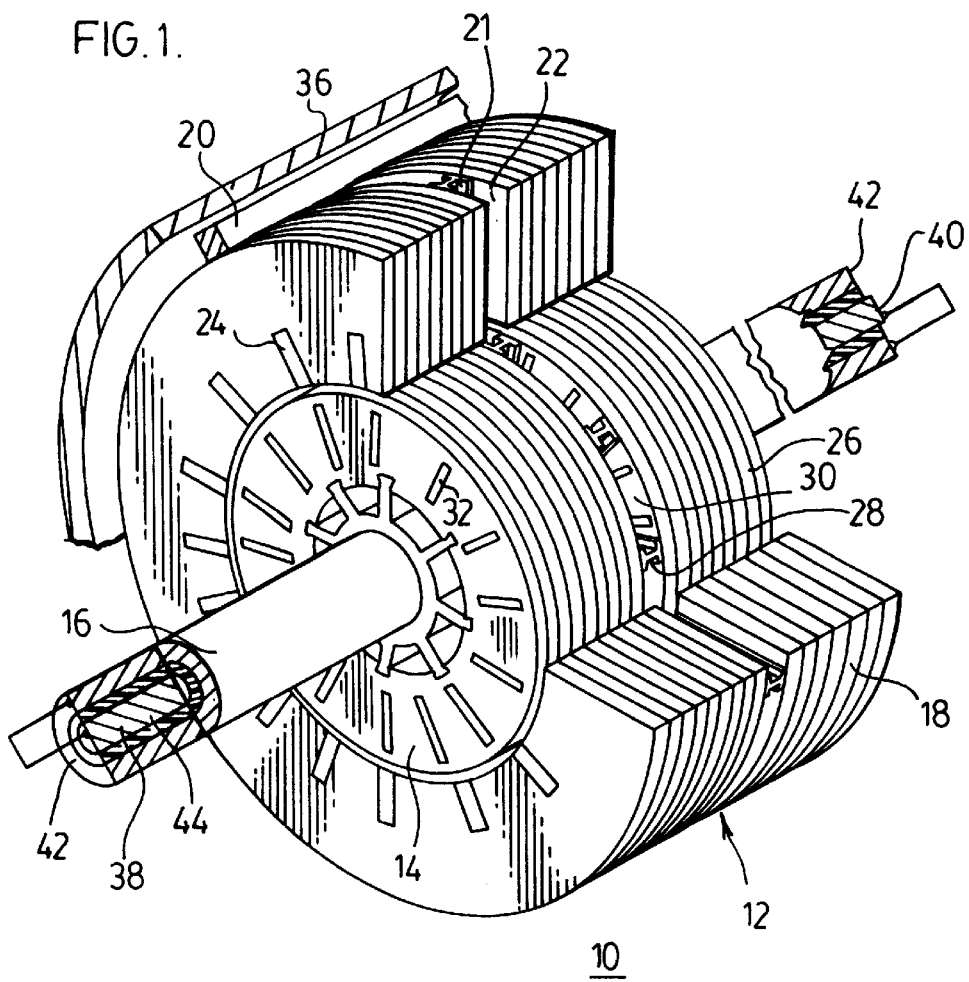
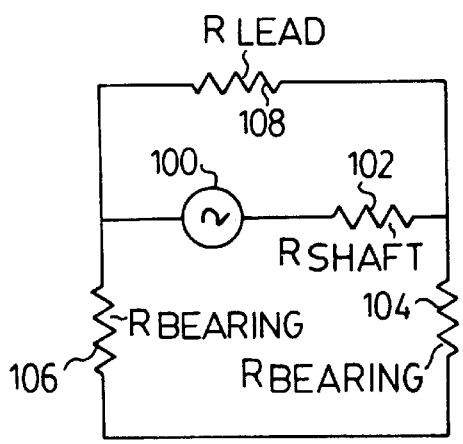
FIG.2.

MINIMIZING SHAFT CURRENTS IN DYNAMOELECTRIC MACHINES

BACKGROUND OF THE INVENTION

The presence of shaft currents in dynamoelectric machines (DEM's) has long been known, but is difficult to measure. Designers have postulated on methods of eliminating the troublesome circulating shaft currents which in some instances can rise to such levels that damage to the bearings, which journal the rotating shaft, often occurs.

Because of the difficulty in assessing the cause of bearing failure in operating DEM's, many bearings have been replaced in DEM's, the demise of which has often been attributed to bearing misalignment or lubrication failure when in reality, the cause of the bearing failure was caused by current circulation through the bearings of the machine and into the DEM pedestals where it could find a convenient return path.

In some troublesome machines, the useful life of a bearing set has been reduced to the order of hours or days by the presence of large circulating currents through the machine. The exact cause of the generation of shaft EMF's is not well understood, but is believed that the production of unbalanced magnetic fields in the DEM's result in generation of sizable zero sequence shaft voltages being induced in the DEM rotor shafts. The magnitude of the resulting circulatory currents in the shaft of the DEM is largely determined by the path resistance through the bearings and the ground return systems and not by the resistance of the shaft itself.

Many solutions have been attempted to ameliorate the circulating current problem and usually the most direct solution lay in increasing the resistance of the ground return paths.

The simplest solution utilized in the past, involved mounting part of the bearing structure in such a manner that the bearings themselves were insulated from their pedestals, or the pedestals were insulated from ground.

SUMMARY OF THE INVENTION

The machine of the invention is modified in its construction to minimize the circulating currents flowing in the shaft of the DEM. The modification consists of providing a hollow shaft for the DEM and passing an insulated conductor through the passageway in the hollow shaft which is rigidly connected to the ends of the rotor shaft. The insulated conductor inside the DEM rotor shaft rotates with the shaft and inhibits any circulating currents from entering the bearings of the machine by providing a low resistance return path. In the end, the insulating conductor functions as a transformer secondary in which any induced current in the insulated conductor opposes the magnetic flux which would induce a circulating current.

RELEVANT PRIOR ART

PUBLICATIONS

WALKER, P. "Preventing Motor Shaft-Current Bearing Failures" Plant Engineering, Oct. 4, 1990.

The Walker reference above provides a lucid explanation of the generation of shaft EMF's and provides various solutions to prevent large circulating shaft currents from being developed. Amongst the solutions are: insulating the bearing pedestals of a DEM; insulating the components of a bearing to insert large resistance in the flow path through the bearings of the DEM; providing an alternative path for current around the machine. The last solution requires the use of brushes mounted on the DEM at each location where the shaft leaves the DEM housing, so that a conductor may be connected to the brushes to "short-circuit" the brushes together and prevent any significant current through the bearings of the DEM. COSTELLO, M. J. "Shaft Voltages & Rotating Machinery" IEEE Paper No. PCIC -91-13, 1991.

This paper lists a number of causes of circulating shaft currents in both electrical and non-electrical machinery. Besides describing the physical damage phenomena resulting from the troublesome circulating shaft currents, the reference teaches the various stimuli which result in circulating shaft currents.

The two types of stimuli that are discussed which are of interest to this application are "sources of residual magnetism" and "magnetic dissymmetry" of the ac machine. Both stimuli result in circulating currents in the rotor shaft and various techniques of inserting insulation into the current circulation loop between the shaft and ground are described.

BRIEF DESCRIPTION OF THE DRAWINGS

FIG. 1 is a perspective of a DEM showing the invention of this application.

FIG. 2 is an equivalent circuit of the current circulation path of the machine of FIG. 1.

DESCRIPTION OF THE PREFERRED EMBODIMENT

Figure 3:
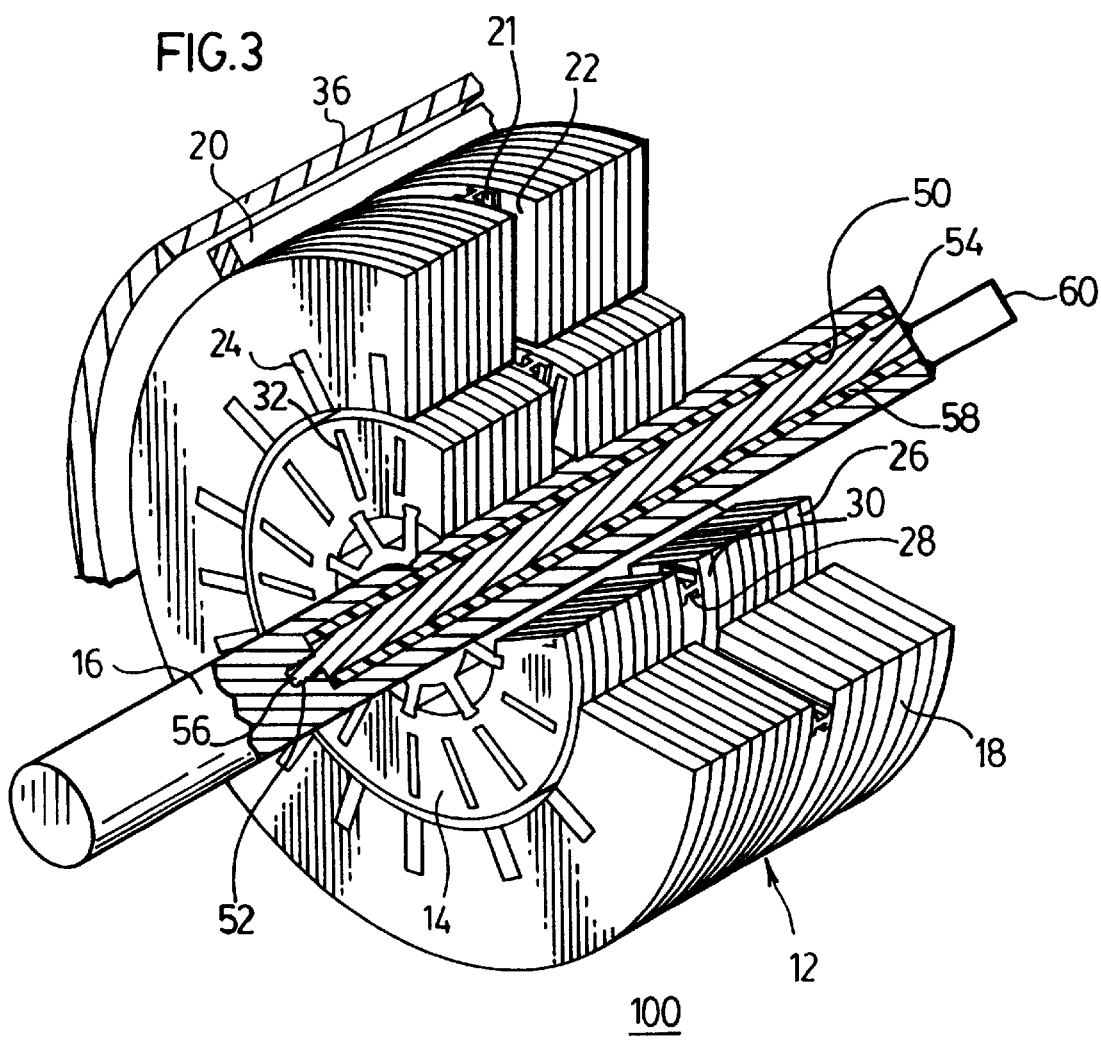
FIG. 3 is an alternative form of this invention.

Referring to FIG. 1, a typical DEM 10 is shown which is a three phase induction motor. DEM 10 has a stator 12 and a rotor 14 mounted on shaft 16.

The stator of DEM 10 comprises packets of magnetic laminations 18 which are mounted within the stator frame, a portion of which is shown at 20. The lamination packets 18 are separated by spacers 21 at predetermined locations to form ventilation ducts 22 for the passage of cooling air therethrough.

The stator is provided with windings 24 which are fitted in slots formed in the lamination packets of DEM 10. The windings 24 are energized from a multi-phase source (in this instance, three phase) to set up a conventional rotating magnetic field in DEM 10.

Rotor 14 follows the conventional construction for a multiphase induction motor rotor. Rotor 14 comprises groups of magnetic laminations arranged in packets 26 which are separated by ventilation spacers 28 to form ventilation ducts 30 through which cooling air may flow.

The rotor ventilation ducts 30 are generally arranged to be aligned with the ventilation ducts 22 in the stator 12 to permit air to readily flow from the rotor 14 into stator 12. The rotor 14 is supplied with conventional windings 32 which usually are bars formed of aluminum or copper or alloys thereof which pass through lamination packets 26. Rotor lamination packets 26 are held secure by suitable fastening means (not shown) which pass through rotor 14.

Rotor 14 will be provided with a pair of shorting rings at each end of rotor 14 (not shown) to which each rotor bar 32 is integrally attached to permit the necessary rotor currents to flow.

The entire stator-rotor structure is housed in housing 36 to provide containment for the DEM 10 and provide air passages for the ventilation air.

Shaft 16 is hollow having a bore 38 passing completely through the shaft. An insulated conductor 40 is located within bore 38 and is integrally fastened to each shaft end 42. Conductor 40 is insulated with insulation 44.

The windings 24 are responsible for the generation of the rotating magnetic field in the DEM 10. In a conventional three phase machine, the windings are each connected in the stator in groups to form the required winding configuration to generate the rotating field. In an ideal situation, the windings in all three phases are identically located, and equally energized and the three magnetic fields are ideally balanced so that the net magnetic fields developed in the stator sum to zero.

But the windings and magnetic structure are never perfect and the imbalance in the stator structure causes a net magnetic field (stray) to induce a current in the shaft 16 of rotor 14.

The rotor 14 also has its own idiosyncrasies and the magnetic fields induced in the rotor bars by the rotating magnetic field of the stator are not entirely balanced. It is believed that the resultant stray magnetic field produced by the rotor 14 and stator 12 causes an induced EMF in shaft 16.

Without conductor 40 in shaft 16, circulating currents will exist where a return path exists for the shaft 16, this path generally includes the bearings of the machine.

In the DEM 10 of this invention, any current induced in shaft 16 is shorted by conductor 40 which is integrally attached to shaft ends 42. It is believed that the conductor 40 acts as a shorted secondary of a transformer and any current circulating in the conductor 40 tends to oppose the magnetic flux, hence there is only a very small resultant current.

FIG. 2 is a schematic diagram of the DEM of FIG. 1.

A generator 100 is shown producing an EMF which is believed to be due to magnetic dissymmetries in the existing machine. The generator 100 causes current to flow through the shaft where the latter is represented by the resistor 102. The potential generated by the generator causes current to flow through the bearings of the DEM 10 as represented by resistors 104 and 106. Resistors 104 and 106 include any insulation inserted in the bearing-ground return circuit which may have been inserted into the current loop to reduce the magnitude of the circulating current. The resistor 108 represents the resistance of the lead passing through the center of the shaft 16. This value may include the resistance of any devices inserted in the shaft lead for purposes of monitoring the shaft current.

It will be found that with the presence of the shaft return lead, the magnitude of the current passing through the bearings is reduced to an insignificant magnitude, so that the integrity of the bearings is preserved and the service life of the DEM is significantly increased.

It will be found that the shaft lead functions to magnetically oppose magnetic fluxes which have induced troublesome shaft and bearing currents in prior art machines.

The shaft lead will also permit the insertion of suitable instrumentation apparatus into the shaft lead to permit monitoring of the currents and voltages present in the shaft lead.

Referring to FIG. 3 where an alternative arrangement of the applicant's invention is shown, wherein like reference numerals are used for like parts of the DEM 100.

In FIG. 3, DEM 100 utilizes a shaft 16 which has been provided with a bore 50. Bore 50 does not traverse the complete shaft as in FIG. 1 but passes through that portion of shaft 16 of DEM 100 which is subject to the active flux linkage causing the induced EMF in the shaft 16. Bore 50 terminates in this instance in a threaded bore 52 which is co-axial with bore 50.

An insulated conductor 54 is shown passing through bore 50. A threaded end 56 of conductor 54 is threaded into threaded bore 52 of shaft 16 so as to form an excellent electrical joint. It will be noted that conductor 54 is provided with a suitable insulative coating 58. The threaded end 52 of insulated conductor 54 forms an electrical connection with the shaft 16 at the location of threaded bore 52 and a bridging member 60 at the right hand end of shaft 16 completes the circuit with conductor 54. It will be found that the conductor 54 may extend throughout the axial length of the stator or rotor and prevent the circulation of destructive currents through the shaft and bearings of the machine. At times it may not be necessary to pass conductor 54 the entire distance that the rotor extends along the shaft 16, depending on the severity of the shaft circulation currents. This method of controlling the magnitude of the circulating current in the shaft and bearings is especially important as a retrofit.

Figure 4:
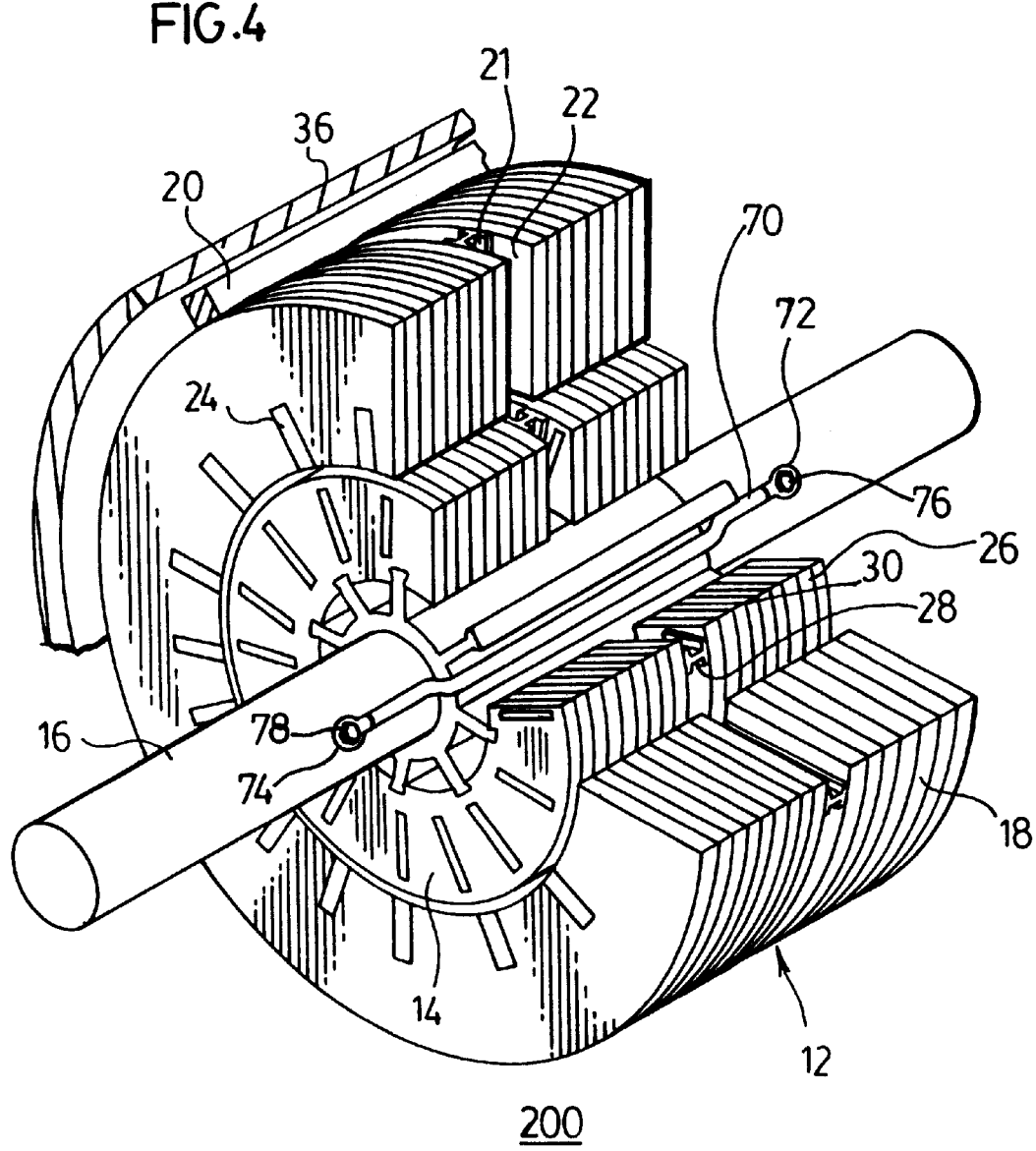
FIG. 4 is yet another alternative of this invention.

FIG. 4 shows another alternative form of the invention. Here, a DEM 200 is shown having a shaft 16 on which rotor 14 is mounted as in previous illustrations. An insulated conductor 70 is mounted adjacent shaft 16. Conductor 70 is connected to a pair of terminals 72 and 74 which are bolted securely to shaft 16 by screws or bolts 76 and 78. The insulated conductor 70 must be closely bound to shaft 16 to preserve the rotor balance and to prevent the generation of EMF's in the insulated conductor 70.

It is possible to use more than one insulated conductor 70 to assist in reducing the level of circulating current in the rotor shaft. Multiple conductors may also improve the unbalance produced by the presence of only one conductor on the shaft.

We claim:

1. A DEM of the ac multi phase induction type having a stator, a rotor mounted on a shaft for rotation within said stator, said shaft having a bore passing through said shaft, insulated conductor means passing through said shaft bore and electrically connected at each end of said shaft.

2. The DEM as claimed in claim 1 wherein the insulated conductor is connected to each end of said shaft to form a current path through said bore.

3. The DEM as claimed in claim 2 wherein said insulated conductor is connected to monitoring circuitry permitting information to be taken from said circuitry.

4. A DEM of the ac multi phase induction type comprising a stator, a rotor mounted on a shaft within said stator on a pair of bearings for rotation within said stator, said shaft having an insulated conductor housed within said shaft and extending a predetermined length within said shaft, said conductor having conductive ends integrally connected to said shaft at each end of said conductor.

5. A DEM as claimed in claim 4 wherein said conductor in said shaft extends between said bearings.

6. A DEM as claimed in claim 5 wherein said conductor extends axially the length of said stator.

7. A DEM of the multiphase type having a stator, a rotor mounted on a shaft for rotation within said stator, said shaft having an insulated conductor held in close proximity to said shaft, and extending the axial length of the rotor along said shaft, said conductor being solidly connected to said shaft at the remote ends of said conductor.

8. A method of reducing the circulating current in the shaft of a dynamo electric machine comprising:

producing a bore of predetermined size in said shaft which extends from one end of said shaft a predetermined distance through said shaft to a bore termination, inserting an insulated conductor in said bore of said shaft, connecting said conductor to said shaft at the ends of said conductor.

9. A method as claimed in claim 8 wherein said bore extends completely through said shaft and said insulated conductor is connected to each end of said shaft.

10. A method of reducing the circulated current in the shaft of a dynamo electric machine comprising:

mounting an insulated conductor in close proximity with said shaft so that said insulated conductor extends a predetermined distance along said shaft, securing said insulated conductor to said shaft, connecting the ends of said conductor to said shaft.

* * * * *

UNITED STATES PATENT AND TRADEMARK OFFICE
CERTIFICATE OF CORRECTION

PATENT NO. : 6,218,757 B1
APPLICATION NO. : 09/200787
DATED : April 17, 2001
INVENTOR(S) : Ong et al.

It is certified that error appears in the above-identified patent and that said Letters Patent is hereby corrected as shown below:

Should Read
We claim:
1. A DEM of the ac multiphase type having a stator, a rotor mounted on a shaft for rotation within said stator, said shaft having a bore passing through said shaft, and at least one insulated conductor means passing through said shaft bore and being electrically connected to said shaft at each end of said conductor means to form a closed current loop with said shaft.
2. The DEM of claim 1 wherein the insulated conductor means is connected to each end of said shaft to form a closed circuit current path with said shaft.
3. The DEM as claimed in claim 2 wherein said insulated conductor means is connected in circuit relationship to monitoring circuitry permitting information to be taken from said circuitry.
4. A DEM of the ac multi phase induction type comprising a stator, a rotor mounted on a shaft within said stator on a pair of bearings for rotation within said stator, said shaft having at least one insulated conductor housed within said shaft and extending a predetermined length within said shaft, each conductor having conductive ends integrally connected to said shaft at each end of each conductor to form a closed loop with said shaft to permit the flow of circulating currents in said loop.
5. A DEM as claimed in claim 4 wherein each conductor in said shaft extends between said bearings.
6. A DEM as claimed in claim 5 wherein each conductor extends axially the length of said stator.
7. A DEM of the multiphase type having a stator, a rotor mounted on a shaft for rotation within said stator, said shaft having at least one insulated conductor held in close proximity to said shaft, and extending the axial length of the rotor along said shaft, said conductor being solidly connected to said shaft at the remote ends of said conductor to form a closed loop with said shaft to permit the flow of circulating currents therein.
8. A method of providing a closed loop for the circulation of current in a shaft of a dynamo electric machine comprising:
    producing a bore of predetermined size in said shaft which extends from one end of said shaft a predetermined distance through said shaft to a bore termination,
    inserting at least one insulated conductor in said bore of said shaft,
    connecting each conductor to said shaft at the ends of each conductor to form a closed loop with said shaft.

UNITED STATES PATENT AND TRADEMARK OFFICE
CERTIFICATE OF CORRECTION

PATENT NO. : 6,218,757 B1
APPLICATION NO. : 09/200787
DATED : April 17, 2001
INVENTOR(S) : Ong et al.

It is certified that error appears in the above-identified patent and that said Letters Patent is hereby corrected as shown below:

9. A method as claimed in Claim 8 wherein said bore extends completely through said shaft and each insulated conductor is solidly connected to each end of said shaft.

10. A method of reducing the circulated current in the shaft of a dynamo electric machine comprising:

mounting at least one insulated conductor in close proximity with said shaft so that said at least one insulated conductor extends a predetermined distance along the surface of said shaft, securing each insulated conductor to said shaft at predetermined locations to fix each conductor to said shaft, connecting the ends of each conductor to said shaft to form a closed current circulation circuit with said shaft.

Signed and Sealed this

First Day of April, 2008

JON W. DUDAS
*Director of the United States Patent and Trademark Office*

UNITED STATES PATENT AND TRADEMARK OFFICE
CERTIFICATE OF CORRECTION

PATENT NO.       : 6,218,757 B1
APPLICATION NO. : 09/200787
DATED            : April 17, 2001
INVENTOR(S)      : Ong et al.

It is certified that error appears in the above-identified patent and that said Letters Patent is hereby corrected as shown below:

Column 4, delete lines 35 thru Column 6 line 5 (claims 1-10) and substitute new claim set (claims 1-10)

We claim:
1. A DEM of the ac multiphase type having a stator, a rotor mounted on a shaft for rotation within said stator, said shaft having a bore passing through said shaft, and at least one insulated conductor means passing through said shaft bore and being electrically connected to said shaft at each end of said conductor means to form a closed current loop with said shaft.
2. The DEM of claim 1 wherein the insulated conductor means is connected to each end of said shaft to form a closed circuit current path with said shaft.
3. The DEM as claimed in claim 2 wherein said insulated conductor means is connected in circuit relationship to monitoring circuitry permitting information to be taken from said circuitry.
4. A DEM of the ac multi phase induction type comprising a stator, a rotor mounted on a shaft within said stator on a pair of bearings for rotation within said stator, said shaft having at least one insulated conductor housed within said shaft and extending a predetermined length within said shaft, each conductor having conductive ends integrally connected to said shaft at each end of each conductor to form a closed loop with said shaft to permit the flow of circulating currents in said loop.
5. A DEM as claimed in claim 4 wherein each conductor in said shaft extends between said bearings.
6. A DEM as claimed in claim 5 wherein each conductor extends axially the length of said stator.
7. A DEM of the multiphase type having a stator, a rotor mounted on a shaft for rotation within said stator, said shaft having at least one insulated conductor held in close proximity to said shaft, and extending the axial length of the rotor along said shaft, said conductor being solidly connected to said shaft at the remote ends of said conductor to form a closed loop with said shaft to permit the flow of circulating currents therein.
8. A method of providing a closed loop for the circulation of current in a shaft of a dynamo electric machine comprising:
    producing a bore of predetermined size in said shaft which extends from one end of said shaft a predetermined distance through said shaft to a bore termination,
    inserting at least one insulated conductor in said bore of said shaft,
    connecting each conductor to said shaft at the ends of each conductor to form a closed loop with said shaft.

UNITED STATES PATENT AND TRADEMARK OFFICE
CERTIFICATE OF CORRECTION

PATENT NO.         : 6,218,757 B1
APPLICATION NO. : 09/200787
DATED                 : April 17, 2001
INVENTOR(S)       : Ong et al.

It is certified that error appears in the above-identified patent and that said Letters Patent is hereby corrected as shown below:

9. A method as claimed in Claim 8 wherein said bore extends completely through said shaft and each insulated conductor is solidly connected to each end of said shaft.

10. A method of reducing the circulated current in the shaft of a dynamo electric machine comprising:

mounting at least one insulated conductor in close proximity with said shaft so that said at least one insulated conductor extends a predetermined distance along the surface of said shaft, securing each insulated conductor to said shaft at predetermined locations to fix each conductor to said shaft, connecting the ends of each conductor to said shaft to form a closed current circulation circuit with said shaft.

This certificate supersedes the Certificate of Correction issued April 1, 2008.

Signed and Sealed this

Sixth Day of May, 2008

JON W. DUDAS
*Director of the United States Patent and Trademark Office*